United States Patent
Gray et al.

(10) Patent No.: US 8,194,721 B2
(45) Date of Patent: Jun. 5, 2012

(54) SIGNAL AMPLITUDE DISTORTION WITHIN AN INTEGRATED CIRCUIT

(75) Inventors: Carl Thomas Gray, Apex, NC (US); Jason Thurston, Raleigh, NC (US)

(73) Assignee: Integrated Device Technology, inc, San Jose, CA (US)

( * ) Notice: Subject to any disclaimer, the term of this patent is extended or adjusted under 35 U.S.C. 154(b) by 828 days.

(21) Appl. No.: 12/153,793

(22) Filed: May 23, 2008

(65) Prior Publication Data
US 2009/0290623 A1  Nov. 26, 2009

(51) Int. Cl.
*H04B 17/00* (2006.01)

(52) U.S. Cl. ........ 375/221; 375/219; 375/224; 375/226; 375/227

(58) Field of Classification Search ............... 375/221, 375/219, 224, 226, 227
See application file for complete search history.

(56) References Cited

U.S. PATENT DOCUMENTS

| | | | |
|---|---|---|---|
| 4,475,088 A | 10/1984 | Beard | |
| 5,132,988 A | 7/1992 | Fisher et al. | |
| 5,150,128 A | 9/1992 | Kongelbeck | |
| 5,392,295 A | 2/1995 | Coker et al. | |
| 5,764,655 A * | 6/1998 | Kirihata et al. | 714/733 |
| 6,163,867 A | 12/2000 | Miller et al. | |
| 6,298,458 B1 | 10/2001 | Cranford, Jr. et al. | |
| 6,694,462 B1 | 2/2004 | Reiss et al. | |
| 6,809,591 B1 | 10/2004 | Ohashi | |
| 7,010,069 B2 | 3/2006 | Chugg et al. | |
| 7,116,953 B2 | 10/2006 | Kim et al. | |
| 7,184,469 B2 * | 2/2007 | Joseph et al. | 375/224 |
| 7,243,272 B2 | 7/2007 | Tarango et al. | |
| 7,295,604 B2 * | 11/2007 | Cranford et al. | 375/226 |
| 7,332,947 B2 * | 2/2008 | Kumar et al. | 327/150 |
| 7,352,165 B2 | 4/2008 | Loke et al. | |
| 7,363,563 B1 * | 4/2008 | Hissen et al. | 714/733 |
| 7,405,594 B1 * | 7/2008 | Xu | 326/82 |
| 7,408,387 B2 | 8/2008 | Suenaga | |
| 7,532,053 B2 | 5/2009 | Rausch | |
| 7,558,991 B2 * | 7/2009 | Mattes et al. | 714/700 |
| 7,577,192 B2 | 8/2009 | Matis | |
| 7,610,526 B2 | 10/2009 | Sherlock et al. | |
| 7,667,502 B2 | 2/2010 | Agarwal | |
| 7,675,363 B2 | 3/2010 | Deguchi et al. | |
| 7,756,197 B1 * | 7/2010 | Ferguson et al. | 375/224 |
| 7,777,998 B2 | 8/2010 | Stockinger et al. | |
| 7,809,052 B2 | 10/2010 | Li | |
| 7,817,387 B2 | 10/2010 | Khazhinsky et al. | |
| 2002/0039052 A1 | 4/2002 | Staub et al. | |
| 2003/0102928 A1 | 6/2003 | d'Haene et al. | |
| 2004/0141268 A1 | 7/2004 | Miller et al. | |
| 2005/0036576 A1 | 2/2005 | Agazzi et al. | |
| 2005/0057872 A1 | 3/2005 | Lee et al. | |
| 2005/0185351 A1 | 8/2005 | Miller et al. | |

(Continued)

FOREIGN PATENT DOCUMENTS
WO  2007/053111  5/2007

*Primary Examiner* — Siu Lee
(74) *Attorney, Agent, or Firm* — Marger Johnson McCollom P.C.; Kenneth Glass

(57) ABSTRACT

An integrated circuit 2 includes a serial data transmitter 12 and a serial data receiver 14. A signal amplitude distorting circuit 30 is provided to introduce distortion in the amplitude of a serial data signal generated by the serial data transmitter 12 and looped back to the serial data receiver 14 so as to stress test the serial data receiver 14.

14 Claims, 3 Drawing Sheets

U.S. PATENT DOCUMENTS

| | | | |
|---|---|---|---|
| 2005/0193290 A1* | 9/2005 | Cho et al. | 714/710 |
| 2005/0245225 A1 | 11/2005 | Park et al. | |
| 2006/0020865 A1* | 1/2006 | Dai et al. | 714/738 |
| 2006/0087328 A1 | 4/2006 | Sasajima | |
| 2006/0087356 A1 | 4/2006 | Minzoni | |
| 2006/0114629 A1 | 6/2006 | Wu et al. | |
| 2007/0026809 A1 | 2/2007 | Zhang et al. | |
| 2007/0053120 A1 | 3/2007 | Gauthier et al. | |
| 2007/0101214 A1 | 5/2007 | Stauffer et al. | |
| 2007/0121713 A1* | 5/2007 | Yamaguchi | 375/224 |
| 2007/0146014 A1 | 6/2007 | Cheung | |
| 2007/0195875 A1 | 8/2007 | Agazzi et al. | |
| 2008/0062597 A1 | 3/2008 | Chen et al. | |
| 2008/0082887 A1* | 4/2008 | Dhong et al. | 714/738 |
| 2008/0130800 A1 | 6/2008 | Maxim et al. | |
| 2008/0225380 A1 | 9/2008 | Heffner et al. | |
| 2008/0226306 A1 | 9/2008 | Heffner et al. | |
| 2008/0232538 A1* | 9/2008 | Goishi | 377/19 |
| 2008/0237587 A1 | 10/2008 | Nierle et al. | |
| 2008/0240212 A1* | 10/2008 | Satou | 375/221 |
| 2008/0285358 A1 | 11/2008 | Nierle | |
| 2009/0003495 A1 | 1/2009 | Wu et al. | |
| 2009/0041101 A1* | 2/2009 | Nagatani | 375/221 |
| 2009/0116851 A1 | 5/2009 | Heffner et al. | |
| 2009/0177457 A1 | 7/2009 | Dai et al. | |
| 2009/0185609 A1 | 7/2009 | Takada | |
| 2009/0249139 A1 | 10/2009 | Wang et al. | |
| 2009/0257334 A1 | 10/2009 | Ogura et al. | |
| 2009/0316767 A1 | 12/2009 | Hidaka | |
| 2010/0020861 A1 | 1/2010 | Leibowitz et al. | |
| 2010/0233971 A1 | 9/2010 | Vassiliou et al. | |

* cited by examiner

SIGNAL AMPLITUDE DISTORTION WITHIN AN INTEGRATED CIRCUIT

BACKGROUND OF THE INVENTION

1. Field of the Invention

This invention relates to the field of integrated circuits. More particularly, this invention relates to the distortion of the amplitude of a signal in order to stress test an integrated circuit.

2. Description of the Prior Art

It is known to provide integrated circuits with high performance data communication mechanisms, such as high data rate serial data communication channels. Within such systems, the ability to successfully overcome amplitude distortion within a received signal is an important performance parameter. In order to test the ability of a serial data receiver to cope with signal amplitude distortion it is known to use external test equipment connected to an integrated circuit to supply the integrated circuit with a signal containing a controlled amount of amplitude distortion in order to investigate how the integrated circuit copes with that amplitude distortion. The use of such external equipment is expensive, complex and comparatively slow.

SUMMARY OF THE INVENTION

Viewed from one aspect the present invention provides an integrated circuit comprising:
a serial data transmitter;
a serial data receiver coupled to said serial data transmitter to provide data communication therewith; and
a signal amplitude distorting circuit coupled to said serial data transmitter to distort an amplitude of a serial data signal sent from said serial data transmitter to said serial data receiver so as to stress test said serial data receiver.

The provision of a signal amplitude distorting circuit coupled to the serial data transmitter in order to deliberately distort the amplitude of a serial data signal generated by that serial data transmitter runs counter to the prejudice in this technical field where considerable care is normally lavished on the design of a serial data transmitter to ensure the opposite behaviour. The on-chip signal amplitude distorting circuit provides the capability for less complex and less expensive testing of the ability of the serial data receiver to cope with a serial data signal having a distorted amplitude. This testing of the serial data receiver can be a manufacturing test to check that an individual integrated circuit has been correctly manufactured, a design characterisation test to check that a design of an integrated circuit has the desired characteristics with respect to coping with signal amplitude distortion and/or a debug test to ensure that a serial data receiver correctly receives serial data that has been subject to normal operational amplitude distortion.

The amplitude distorting circuit can distort the signal amplitude in a wide variety of different ways. In one form of distortion the amplitude distortion circuit modulates the amplitude at a frequency controlled by a frequency specifying signal supplied to the amplitude distorting circuit. In another form of distortion the amplitude distorting circuit modulates the amplitude with a pattern controlled by a pattern specifying signal supplied to the amplitude distorting circuit.

In some embodiments the signal amplitude distorting circuit can include an integrating circuit generating an integrated signal representing an integral of data values output from the serial data transmitter circuit during a preceding interval with the signal amplitude distorting circuit being responsive to the integrated signal to modulate the amplitude so as to simulate inter-symbol interference within the serial data signal. Inter-symbol interference is a significant performance limiting factor and accordingly the ability to simulate the occurrence of this type of amplitude distortion is beneficial.

It will be appreciated that the serial data transmitter can have a variety of different forms. In one form the serial data transmitter comprises a current mode logic buffer generating a serial data signal and a bias voltage network controlling total current flow through the current mode logic buffer. In this context, the amplitude distorting circuit can distort the amplitude by injecting a modulated signal into the bias voltage network.

Viewed from another aspect the present invention provides an integrated circuit comprising:
serial data transmitter means for transmitting serial data;
serial data receiver means for receiving serial data and coupled to said serial data transmitter means to provide data communication therewith; and
signal amplitude distorting means coupled to said serial data transmitter for distorting an amplitude of a serial data signal sent from said serial data transmitter means to said serial data receiver means so as to stress test said serial data receiver means.

Viewed from a further aspect the present invention provides a method of testing an integrated circuit having a serial data transmitter and a serial data receiver coupled to said serial data transmitter to provide data communication therewith, said method comprising the step of:
using signal amplitude distorting means within said integrated circuit and coupled to said serial data transmitter to distort an amplitude of a serial data signal sent from said serial data transmitter means to said serial data receiver means so as to stress test said serial data receiver means.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
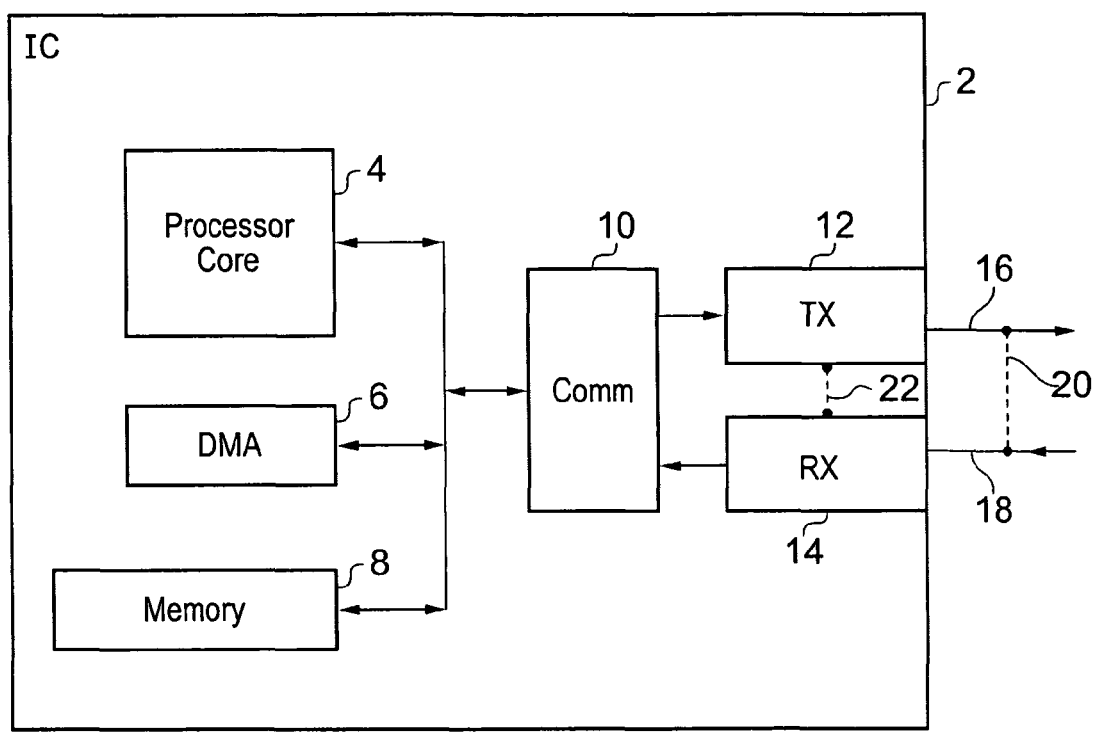
FIG. 1 schematically illustrates an integrated circuit including a serial data transmitter and a serial data receiver.

FIG. 1 schematically illustrates an integrated circuit 2 including a plurality of circuit blocks including a processor core 4, a DMA unit 6, a memory 8, a communication circuit 10, a serial data transmitter 12 and a serial data receiver 14. It will be appreciated that the integrated circuit 2 could include many additional circuit blocks and/or alternative circuit blocks.

The serial data transmitter 12 and the serial data receiver 14 are connected to external serial data communication lines 16, 18 via which communication with external circuits may be performed during an operational mode of use. Also illustrated in FIG. 1 are loopback connections 20, 22 which may be provided either externally or internally of the integrated circuit 2 in order that a serial data signal generated by the serial data transmitter 12 can be directed to the serial data receiver 14 on the same integrated circuit 2. This loopback feature is useful in providing integrated circuit self-test (amplitude distortion stress testing) as will be described further below.

Figure 2:
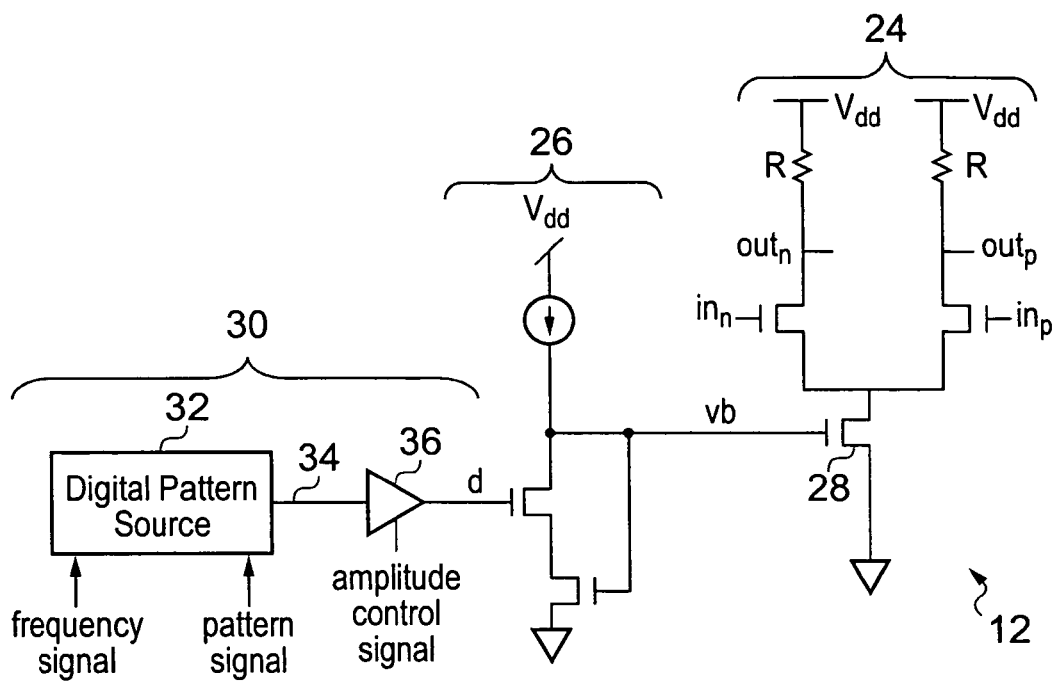
FIG. 2 schematically illustrates a portion of a serial data transmitter coupled to an amplitude distorting circuit.

FIG. 2 illustrates a portion of the serial data receiver 12 including a current mode logic buffer 24 coupled to a bias voltage network 26 which controls current flow through the current mode logic buffer 24 and accordingly the amplitude of the serial data signal generated by the current mode logic buffer 24. The action of the current mode logic buffer 24 is to generate an output voltage between the output signal lines outn and outp in response to an input signal applied on input signal lines inn and inp. The action of the bias voltage network 26 is to maintain a bias voltage vb on the current tail gate 28 so as to maintain a controlled current through the current mode logic buffer 24. In non-test operation, the magnitude of the current flow through the current mode logic buffer 24 is held constant so as to avoid distorting the amplitude of the serial data signal generated. In accordance with the present techniques this current through the current mode logic buffer 24 is deliberately modulated/changed during test operation so as to distort the amplitude of the generated serial data signal (signal between outn and outp).

FIG. 2 includes an amplitude distorting circuit 30 which injects a modulated signal d into the bias voltage network 26 so as to modulate the bias voltage vb and accordingly modulate the current through the current mode logic buffer 24 thereby distorting the serial data signal amplitude. The amplitude distorting circuit 30 includes a digital pattern source 32 which is responsive to a frequency selecting signal and a pattern selecting signal to generate a modulation signal 34 which is then passed via a buffer 36 where it is subject to a variable degree of amplification under control of a amplitude control signal so as to generate the modulated signal d. In this way the modulated signal d can have an amplitude controlled by the amplitude control signal, a pattern (e.g. square wave, triangular wave, sawtooth, sinusoidal, etc) controlled by the pattern selecting signal and a frequency controlled by the frequency selecting signal. The modulated signal d injected into the bias voltage network 26 imposes a corresponding modulation on the bias voltage vb and accordingly a corresponding distortion/modulation in the amplitude of the serial data signal produced by the current mode logic buffer 24.

It will be appreciated that the digital pattern source is a digital circuit in this example embodiment and may store data defining a variety of patterns of signals which can be generated together with circuits for selecting the frequency at which those patterns will be generated. It will also be possible to use an analog circuit to perform these functions.

Figure 3:
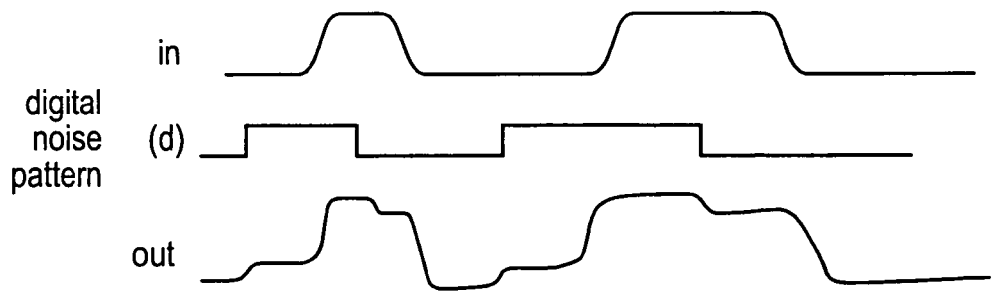
FIG. 3 schematically illustrates example waveforms generated during the operation of the circuit of FIG. 2.

FIG. 3 illustrates an example of waveforms generated during the operation of the circuits illustrated in FIG. 2. The input signal IN to the current mode logic buffer 24 is a data signal in which the signal transitions have a finite slew rate and are subject to degrees of minor distortion as is normal in a real operational signal. The modulated signal d generated from the buffer 36 is, in this example, a square wave having a varying frequency in a manner which simulates a noise when used to distort the signal amplitude of the serial data signal. The output from the current mode logic buffer 24 is illustrated showing the influence of the noise pattern in distorting the signal amplitude of the signal generated.

The serial data signal generated by the current mode logic buffer 24 within the serial data transmitter 12 is transferred via one of the loopback paths 20, 22 to the serial data receiver 14. The serial data receiver 14 then attempts to recover the clock signal and the data values from this received serial data signal despite the distorted amplitude which has been imposed thereon. The distorted amplitude stress tests the serial data receiver 14. This stress testing can be part of a manufacturing test to ensure correct manufacture of an individual integrated circuit, part of design characterisation of a design (e.g. to check that it meets a desired design specification) and/or part of debug testing to ensure that the serial data receiver 14 can operate to successfully receive data subject to a normal degree of operational amplitude distortion.

Figure 4:
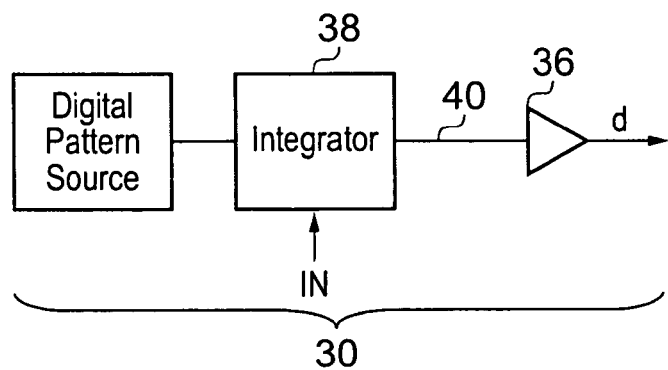
FIG. 4 schematically illustrates an alternative form of amplitude distorting circuit including an integrating circuit.

FIG. 4 illustrates an alternative form of amplitude distorting circuit 30. A combined form is also possible in which the amplitude distorting circuits illustrated in FIG. 2 are combined with the amplitude distorting circuits illustrated in FIG. 4. In the example of the amplitude distorting circuit of FIG. 4, an integrated circuit 38 is provided to generate an integral signal 40 representing an integral of data values output from the serial transmitter circuit 12 (represented by the signal in). This integrated signal is then amplified by the buffer 36 to generate the modulated signal d.

Figure 5:
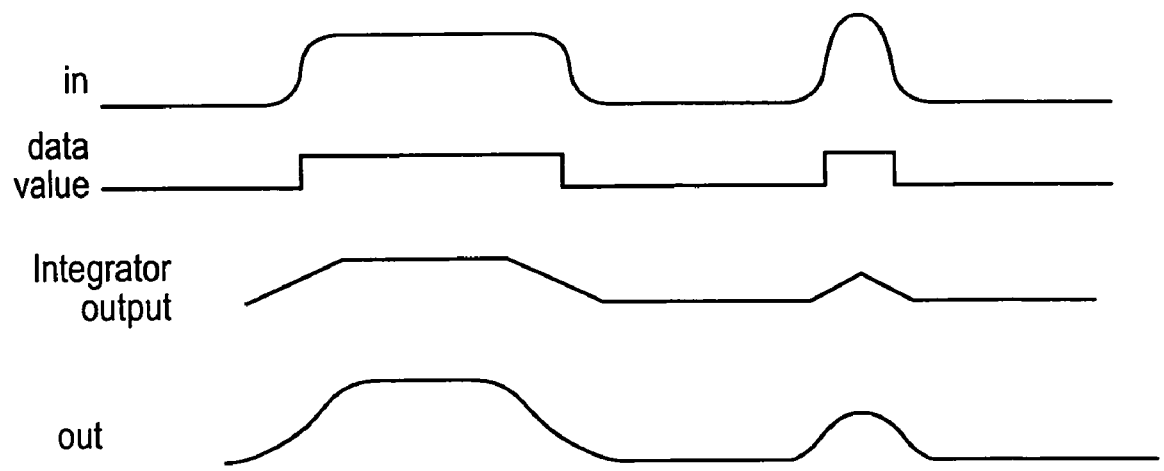
FIG. 5 schematically illustrates waveforms produced during the operation of the serial data transmitter of FIG. 2 when using the amplitude distorting circuit of FIG. 4.

FIG. 5 schematically illustrates a number of waveforms arising during the operation of the circuit of FIG. 2 when using the amplitude distorting circuit 30 of FIG. 4. The input signal values in supplied to the current mode logic buffer 24 is illustrated together with the data value being represented. The integrating circuit 38 integrates the data value and generates an integrated signal which is output to the buffer 36. The action of the modulated signal d generated in this way is to simulate inter-symbol interference within the serial data signal whereby the signal value associated with a data value is influenced by the signal values associated with surrounding data values. FIG. 5 in its final waveform illustrates a serial data signal having an amplitude distorted in accordance with simulated inter-symbol interference.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:
   a serial data transmitter;
   a serial data receiver coupled to the serial data transmitter; and
   a signal amplitude distorting circuit coupled to the serial data transmitter to distort an amplitude of a serial data signal transmitted from the serial data transmitter to the serial data receiver, wherein the signal amplitude distorting circuit modulates the amplitude of the serial data signal with a waveform pattern controlled by a waveform pattern selecting signal at a frequency controlled by a frequency selecting signal.

2. The integrated circuit of claim 1, wherein the signal amplitude distorting circuit includes an integrating circuit generating an integrated signal representing an integral of data values output from the serial data transmitter during a preceding interval, the signal amplitude distorting circuit being responsive to the integrated signal to modulate the amplitude of the serial data signal so as to simulate inter-symbol interference with the serial data signal.

3. The integrated circuit of claim 1, wherein the serial data transmitter comprises:

a current mode logic buffer to generate the serial data signal; and a bias voltage network to control a total current flow through the current mode logic buffer.

4. The integrated circuit of claim 3, wherein the amplitude distorting circuit injects a modulated signal into the bias voltage network to distort the amplitude of the serial data signal.

5. The integrated circuit of claim 1, wherein the waveform pattern is selected from the group consisting of square waveform, triangular waveform, sawtooth waveform and sinusoidal waveform.

6. A method of testing an integrated circuit having a serial data transmitter and a serial data receiver coupled to the serial data transmitter, the method comprising:

distorting an amplitude of a serial data signal at the serial data transmitter, wherein the amplitude of the serial data signal is distorted by modulating the amplitude of the serial data signal with a waveform pattern controlled by a waveform pattern selecting signal at a frequency controlled by a frequency selecting signal and;

transmitting the amplitude distorted serial data signal to the serial data receiver.

7. The method of claim 6 wherein distorting an amplitude of the serial data signal further comprises generating an integrated signal representing an integral of data values output from the serial data transmitter during a preceding interval, and wherein the amplitude is distorted responsive to the integrated signal to modulate the amplitude to simulate inter-symbol interference within the serial data signal.

8. The method of claim 6 further comprising, generating the serial data signal at a current mode logic buffer of the serial data transmitter; and controlling a total current flow through the current mode logic buffer with a bias voltage network.

9. The method of as claim 8 further comprising, injecting a modulated signal into the bias voltage network so as to distort the amplitude.

10. The integrated circuit of claim 6, wherein the waveform pattern is selected from the group consisting of square waveform, triangular waveform, sawtooth waveform and sinusoidal waveform.

11. An integrated circuit comprising:

a serial data transmitter that includes a current mode logic buffer and a bias voltage network to control a total current flow through the current mode logic buffer;

a serial data receiver coupled to the serial data transmitter; and a signal amplitude distorting circuit coupled to the serial data transmitter to distort an amplitude of a serial data signal sent from the serial data transmitter to the serial data receiver, wherein the signal amplitude distorting circuit modulates the amplitude of the serial data signal with a waveform pattern controlled by a waveform pattern selecting signal at a frequency controlled by a frequency selecting signal.

12. The integrated circuit of claim 11, wherein the signal amplitude distorting circuit includes an integrating circuit generating an integrated signal representing an integral of data values output from the serial data transmitter during a preceding interval, the signal amplitude distorting circuit being responsive to the integrated signal to modulate the amplitude of the serial data signal so as to simulate inter-symbol interference with the serial data signal.

13. The integrated circuit of claim 11, wherein the amplitude distorting circuit injects a modulated signal into the bias voltage network to distort the amplitude of the serial data signal.

14. The integrated circuit of claim 11, wherein the waveform pattern is selected from the group consisting of square waveform, triangular waveform, sawtooth waveform and sinusoidal waveform.

* * * * *

UNITED STATES PATENT AND TRADEMARK OFFICE
CERTIFICATE OF CORRECTION

PATENT NO.        : 8,194,721 B2
APPLICATION NO.   : 12/153793
DATED             : June 5, 2012
INVENTOR(S)       : Carl Thomas Gray and Jason Thurston Page 1 of 1

It is certified that error appears in the above-identified patent and that said Letters Patent is hereby corrected as shown below:

Column 5, line 20, claim 6, replace "signal and;" with --signal; and--.

Column 5, line 35, claim 9, delete the word "as".

Signed and Sealed this
Twenty-fifth Day of September, 2012

David J. Kappos
*Director of the United States Patent and Trademark Office*